United States Patent
Smith et al.

(10) Patent No.: US 10,681,666 B2
(45) Date of Patent: Jun. 9, 2020

(54) COARSE LOCATION ESTIMATION FOR MOBILE DEVICES

(71) Applicant: Apple Inc., Cupertino, CA (US)

(72) Inventors: Brian Stephen Smith, Campbell, CA (US); Joseph Ding-Jiu Huang, Kingston (CA); Ilya K. Veygman, Palo Alto, CA (US); Robert Mayor, Half Moon Bay, CA (US); David Benjamin Millman, Mountain View, CA (US); Abhinav R. Patel, Mountain View, CA (US); Vitali Lovich, San Jose, CA (US)

(73) Assignee: Apple Inc., Cupertino, CA (US)

( * ) Notice: Subject to any disclaimer, the term of this patent is extended or adjusted under 35 U.S.C. 154(b) by 551 days.

(21) Appl. No.: 14/479,228

(22) Filed: Sep. 5, 2014

(65) Prior Publication Data

US 2016/0062949 A1    Mar. 3, 2016

Related U.S. Application Data

(60) Provisional application No. 62/044,170, filed on Aug. 29, 2014.

(51) Int. Cl.
*H04W 64/00*    (2009.01)
*H04W 4/029*    (2018.01)
*G01S 19/48*    (2010.01)
*G01S 5/02*    (2010.01)

(52) U.S. Cl.
CPC ........... *H04W 64/00* (2013.01); *G01S 5/0263* (2013.01); *G01S 5/0273* (2013.01); *G01S 19/48* (2013.01); *H04W 4/029* (2018.02)

(58) Field of Classification Search
CPC ....... H04W 4/02; H04W 64/00; H04W 4/029; G01S 5/0273; G01S 19/48; G01S 5/0263

USPC ........ 702/150; 701/451; 709/200, 206, 207; 455/465.5, 456.6
See application file for complete search history.

(56) References Cited

U.S. PATENT DOCUMENTS

| 7,257,411 B2 | 8/2007 | Gwon et al. |
| 7,956,808 B2 | 6/2011 | Boyer et al. |
| 8,204,684 B2 | 6/2012 | Forstall et al. |
| 8,560,004 B1 | 10/2013 | Tsvetkov et al. |

(Continued)

FOREIGN PATENT DOCUMENTS

| CN | 101907714 | 12/2010 |
| WO | WO 2012/145792 | 11/2012 |

OTHER PUBLICATIONS

Gao et al., "Multi-Sensor Optimal Data Fusion for INS/GPS/SAR Integrated Navigation System," Aerospace Science and Tech., 13(4-5):232-237 (2009).

*Primary Examiner* — Catherine T. Rastovski
(74) *Attorney, Agent, or Firm* — Fish & Richardson P.C.

(57) ABSTRACT

Coarse location estimation for mobile devices is disclosed for detecting mobile device presence at general locations of interest and switching operating modes and services for one or more location context aware applications. In some implementations, sensor data is received from a plurality of data sources at a location. For each data source, a first probability is estimated that the mobile device is at the location based on sensor data from the data sources. A second probability is estimated that the mobile device is not at the location based on sensor data from the data sources. The first and second estimated probabilities are statistically combined to generate a third estimated probability that the mobile device is at the location.

15 Claims, 4 Drawing Sheets

(56) References Cited

U.S. PATENT DOCUMENTS

| | | |
|---|---|---|
| 8,568,310 B2 | 10/2013 | Kahn et al. |
| 2009/0005070 A1 | 1/2009 | Forstall et al. |
| 2010/0255856 A1 | 10/2010 | Kansal et al. |
| 2013/0231130 A1 | 9/2013 | Cherian et al. |
| 2014/0141803 A1 | 5/2014 | Marti et al. |

COARSE LOCATION ESTIMATION FOR MOBILE DEVICES

CROSS-REFERENCE TO RELATED APPLICATION

This application claims priority to U.S. Provisional Patent Application No. 62/044,170, entitled "Coarse Location Estimation for Mobile Devices," filed Aug. 29, 2014, the entire contents of which is incorporated herein by reference.

TECHNICAL FIELD

This disclosure relates generally to location estimation for mobile devices.

BACKGROUND

Multi-sensor data fusion combines sensor data from a variety of data sources. One application of multi-sensor fusion is Global Positioning System (GPS) and Inertial Navigation System (INS) data fused together using, for example an Extended Kalman Filter (EKF) for estimating the navigation state of an airplane, spacecraft, automobile or mobile device. Estimating the coarse location of a mobile device is a challenging problem, for which multiple sensors yield useful information and no single sensor may provide a sufficient estimate to be useful.

SUMMARY

Coarse location estimation for mobile devices is disclosed for detecting mobile device presence at general locations of interest and switching operating modes and services for a location context aware user experience.

In some implementations, a method comprises: receiving, by a computing device operating at a location, sensor data from a plurality of data sources; determining a first estimated probability that the computing device is at the location based on first sensor data from a first data source and a first data source model; determining a second estimated probability that the computing device is at the location based on second sensor data and a second data source model; combining the first and second estimated probabilities; and generating a coarse estimate of the location of the computing device based on the combined first and second estimated probabilities.

Other implementations are directed to systems, devices and non-transitory, computer-readable storage mediums. Particular implementations disclosed herein provide one or more of the following advantages. A coarse location estimator uses a data fusion framework and data source models to estimate, given multiple locations of interest, the coarse location state of a mobile device. The estimator is extendable to multiple data sources, which can be incorporated and removed to improve coarse location estimation or reduce computational complexity.

The details of the disclosed implementations are set forth in the accompanying drawings and the description below. Other features, objects and advantages are apparent from the description, drawings and claims.

DESCRIPTION OF DRAWINGS

The same reference symbol used in various drawings indicates like elements.

DETAILED DESCRIPTION

Example Operating Environment

Figure 1:
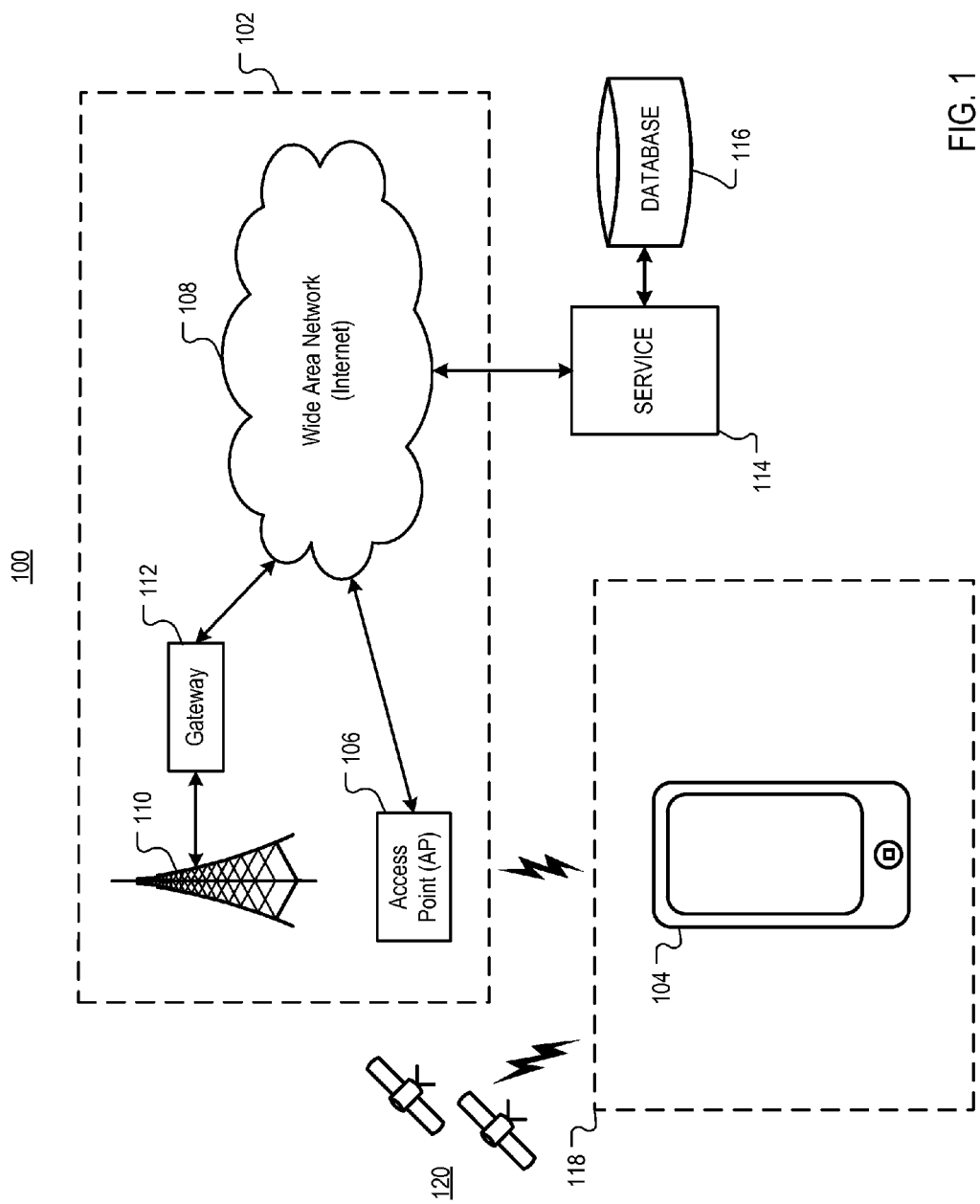
FIG. 1 illustrates an exemplary operating environment for coarse location estimation for mobile devices.

FIG. 1 illustrates an exemplary operating environment 100 for coarse location estimation for mobile devices. In some implementations, operating environment 100 can include mobile device 104 operating at location 118 and configured to be in communication with service 114 through communication network 102. Communication network 102 includes access point 106, cell tower 110, gateway 112 and wide area network 108 (e.g., the Internet). Service 114 is coupled to database 116.

In some implementations, mobile device 104 can include but is not limited to a portable computer, smart phone, tablet computer or wearable device. Mobile device 104 can include one or more satellite or terrestrial positioning systems, such as Global Positioning System (GPS), a WiFi positioning system (using API 106) or cellular position system (using cell tower 110 and gateway 112). An exemplary architecture for mobile device 104 is described in reference to FIG. 4.

In some implementations, mobile device 104 can include a centralized location service that provides client applications running on mobile device 104 with location estimates derived from multiple positioning systems. For example, a client application can be a maps application that allows a user to determine their current location on a map and receive route guidance between points of interest (POIs). A user can interact with a graphical user interface (GUI) or provide a voice command to a digital assistant to search for a point of interest (e.g., a nearby coffee shop) using a search engine. A map presented on a display device of mobile device 104 can include markers showing the current location of the POI and mobile device 104. A route with directions to the POI can be generated and displayed on the map.

In some implementations, a centralized location service of mobile device 104 can use a state estimator to estimate position, velocity, acceleration and orientation (yaw, pitch, roll) of mobile device 104. Some example estimators are the Extended Kalman Filter (EKF) and the particle filter (PF). An EKF operates recursively on streams of noisy input data to produce a statistically optimal estimate of the navigation state of mobile device 104. A PF estimates the posterior density of navigation state variables given the sensor data. The particle filter is designed for a hidden Markov Model, where the system consists of hidden and observable variables and the observable variables are related to the hidden variables by some known function.

The EKF and PF can receive data from various sensors including but not limited to accelerometers, gyro rate sensors, magnetometers, altimeters, barometric pressure sensors and generate estimates of the navigation state of mobile device 104. If mobile device 104 is operating outdoors and satellite visibility is good precise estimates of location can be generated by a GPS receiver using an EKF or PF. Also an estimate of location can be generated using received signal strengths from at least three cell towers of a cellular network using trilateration and known locations of the cell towers. If mobile device 104 is operating indoors, estimates of location can be determined using access points (APs) of a wireless network (e.g., WiFi routers) and trilateration based on received signal strengths from at least three APs and known locations of the APs.

In some instances, operating environment 100 prevents one or more of the aforementioned positioning systems from providing an accurate location estimate. For example, when transitioning from an outdoor environment to an indoor environment, a GPS position estimate may have significant error compared to a WiFi position estimate. In a dense urban environment where multipath effects are significant, a cellular position estimate may be more accurate than a GPS position estimate. In all these operating environments, it is desirable to have a coarse location estimate that leverages all available location data sources.

Example System

Figure 2:
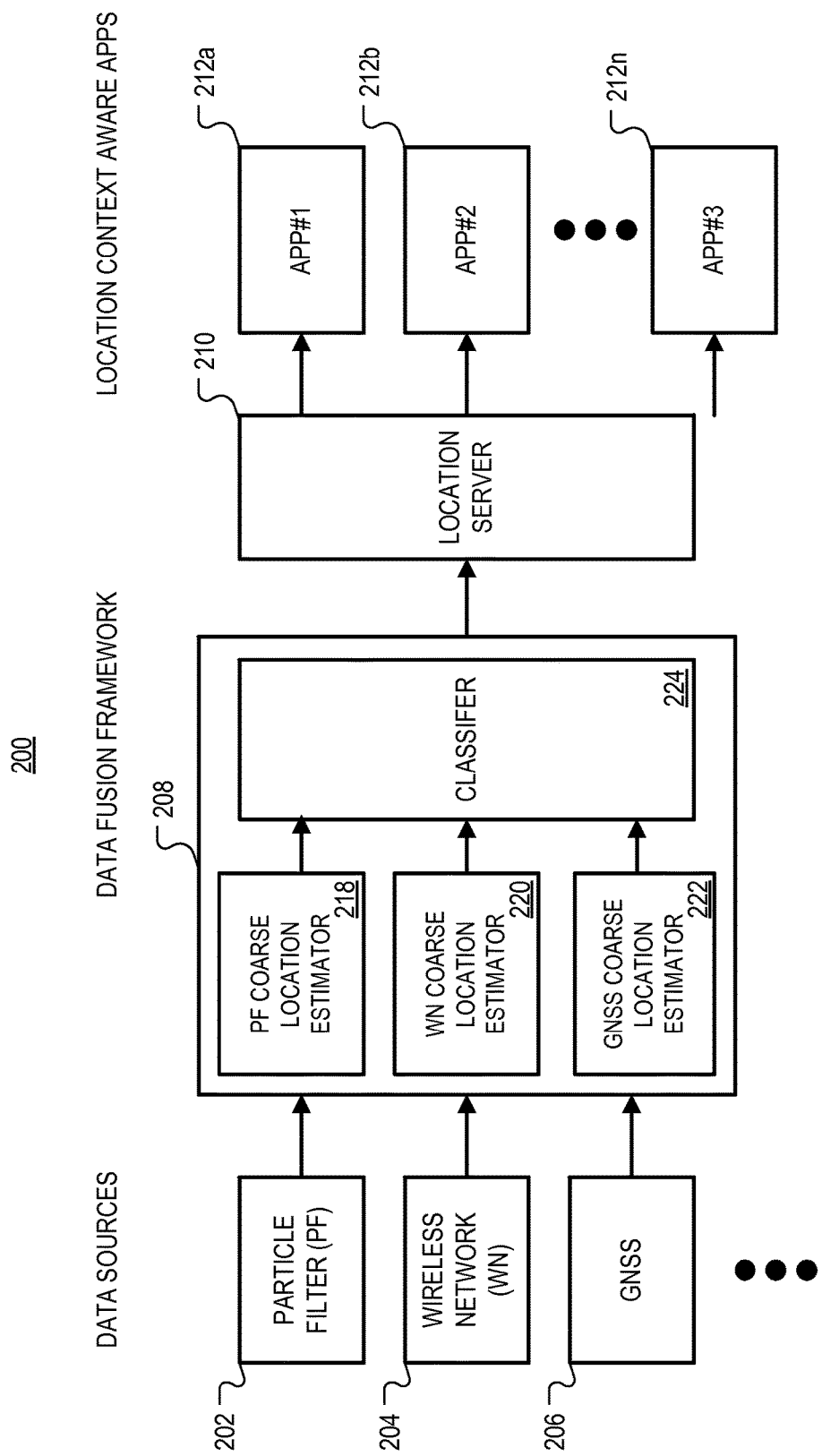
FIG. 2 is a conceptual block diagram of an example system for coarse location estimation for mobile devices.

FIG. 2 is a conceptual block diagram of example system 200 for coarse location estimation. In some implementations, system 200 can include particular filter (PF) data source 202, wireless network (WN) data source 204, Global Navigation Satellite System (GNSS) data source 206, data fusion module 208, location server 210 and client applications 212a-212n. Data fusion module 208 can further include PF coarse location estimator 218, WN coarse location estimator 220, GNSS coarse location estimator 222 and classifier 224.

PF coarse location estimator 202 can be a particle filter that provides a position estimate of mobile device 104 based on sensor data. WN coarse location estimator 204 can be a WiFi positioning system that uses received signal strengths of transmitters, known transmitter locations and trilateration to determine a position estimate for mobile device 104. GNSS coarse location estimator can be a position estimate from a GPS receiver of mobile device 104. Classifier can be, for example, a Bayesian classifier. Location server can be, for example, an operating system service that receives a coarse location estimate from classifier 224 and distributes the coarse location estimate to one or more client applications 212a-212n. Client applications 212a-212n can be location context aware applications. Some examples of client applications 212a-212n include but are not limited to mapping, navigation/routing, friend tracking, local search or any other application that uses location information to perform a task.

System 200 is a data fusion framework for estimating whether mobile device 104 is at one of multiple, general locations of interest, providing mobile device 104 with location context awareness. Because system 200 is a framework it is immediately extensible to use new and different sensors and data sources.

Location context awareness is useful for applications and services which are meaningful or available in specific contexts. For example, detailed interior building maps are only meaningful for indoor environments at a specific, relevant location. Additionally, location context awareness can be used by applications that operate differently based on context. For example, navigating in the interior of a building compared with navigating outdoors.

System 200 will now be described in further detail by defining preliminary definitions, deriving statistical models for coarse location estimators 218, 220, 222 for data sources 202, 204, 206 and combining the statistical models into a classifier (e.g., Bayesian).

Example Data Fusion Framework

A. Preliminary Definitions

We define n∈N locations. For each location i, we define $L_i$ as the state of being at location i, and $\overline{L}_i$ as the state of not being at location i. The goal of the system is, for each location i∈{1, ..., n}, to estimate the probability of being at location i.

As an input, the coarse location estimator has one or more data sources. These could be sensor data from multiple sensors, such as wireless networking, GPS etc., or more processed data sources, like information from a PF location estimator. We define m∈N as the number of data sources. At any given time t∈R, the input from a data source j∈{1, ..., m} is denoted $d_j(t)$, such that $d_1(t), \ldots, d_m(t)$ describes, for a given time t, all the data information available to the coarse location estimator.

We define P(a|b) as the conditional probability of a given b. This implies that the goal of the coarse location estimator is to estimate for each location i and time t, $P(L_i|d_1(t), \ldots d_m(t))$. From this, the probability of not being at location i is immediately available as $P(\overline{L}_i|d_1(t), \ldots d_m(t)) = 1 - P(L_i|d_1(t))$.

B. Data Fusion Framework

For each location and each data source, statistical models are defined that describe the likelihood of observing data inputs while at each location of interest. We assume that the data sources are conditionally independent, given a location state. That is, we assume that, if it is known that the device is at location i, then the expected data from source j∈{1, ..., m} does not depend on any data from source {1, ..., m}/j, where "/" denotes set minus notation. These models can be derived from surveys of the locations of interest, from harvest data, or from experiments. Therefore, given each location i and data source j, we define its corresponding model as $P(d_1(t)|L_i)$.

In addition, for each location i, we define $P(L_i)$ as the prior estimate for the probability of being at location i. Given these data models, for each location i, we estimate the probability of being at location i by combining them in a classifier (e.g., a Bayesian classifier) as $$P(L_i | d_1(t), \ldots, d_m(t)) = \frac{P(d_1(t)|L_i) \ldots P(d_m(t)|L_i)P(L_i)}{P(d_1(t)|L_i) \ldots P(d_m(t)|L_i) + P(d_1(t)|\overline{L}_i) \ldots P(d_m(t)|\overline{L}_i)}.$$

In cases where prior location estimates are unknown or unavailable, we can drop the prior, resulting in $$P(L_i | d_1(t), \ldots, d_m(t)) = \frac{P(d_1(t)|L_i) \ldots P(d_m(t)|L_i)}{P(d_1(t)|L_i) \ldots P(d_m(t)|L_i) + P(d_1(t)|L_i) \ldots P(d_m(t)|L_i)}.$$

Since the denominator is just the sum of the probabilities of being at location i and not a location i, it can be replaced by a normalization constant, resulting in $$P(L_i \mid d_1(t), \ldots, d_m(t)) = \frac{P(d_1(t) \mid L_i) \ldots P(d_m(t) \mid L_i)P(L_i)}{\eta}, \quad [1]$$

$$P(L_i \mid d_1(t), \ldots, d_m(t)) = \frac{P(d_1(t) \mid L_i) \ldots P(d_m(t) \mid L_i)}{\eta}. \quad [2]$$

Here, $\eta$ is the sum of the denominators, which are estimated for each location i, for $L_i$ and $\bar{L}_i$. By using the formulation in equations [1] and [2], the data fusion network is immediately extensible. Different data source models can be added and removed from equations [1] and [2] to improve the estimation or reduce the computational complexity.

C. Data Sources

1. Observable Wireless Access Points (AP)

For each location i, we have location survey data from mobile devices, which is collected from survey devices. These devices collect wireless network scans while at locations. While at location i at a given time t, each survey device observes $d_{wifi}(t)$ APs. Therefore, we can define the number of visible wireless APs as a data source. From this training data, we can define and estimate a likelihood parameter $\theta_{wifi,L_i}$ by maximum likelihood estimation, and we assume that $d_{wifi}(t)$ is distributed at location i with the probability distribution $P(d_{wifi}(t)|\theta_{wifi,L_i})$, given that the device is at location i. Therefore, $P(d_{wifi}(t)|L_i)=P(d_{wifi}(t)|\theta_{wifi,L_i})$.

Similarly, survey data from outside location i can be used to define a likelihood parameter $\bar{\theta}_{wifi,\bar{L}_i}$, describing the distribution of those APs seen at location i that are observable when not at location i according to the probability distribution $P(d_{wifi}(t)|\bar{\theta}_{wifi,\bar{L}_i})=P(d_{wifi}(t)|\bar{L}_i)$.

Substituting into equations [1] and [2], this implies that a wireless networking coarse location estimator is defined by $$P(L_i \mid d_{wifi}(t)) = \frac{P(d_{wifi}(t) \mid L_i)P(L_i)}{P(d_{wifi}(t) \mid L_i) + P(d_{wifi}(t) \mid \bar{L}_i)}. \quad [3]$$

or, without prior location estimates and using a normalization constant, $$P(L_i \mid d_{wifi}(t)) = \frac{P(d_{wifi}(t) \mid L_i)}{\eta}. \quad [4]$$

This simple formulation could be extended to incorporate time windows for WiFi scans, visible APs over multiple frequencies, received signal strength and other information associated with survey data.

2. GPS Information

We define a position in a global reference frame (e.g., geodetic) as $p \in G=[-180,180] \times [-90,90] \times R$, such that $p=[\text{latitude, longitude, altitude}]^T$. For each location i, we define a location space as $$\Omega_i \subset G, \quad [5]$$

such that each $p \in \Omega_i$ corresponds to a position at location i.

The GPS system provides a mobile device location estimate $\tilde{p}$ with uncertainty defined by parameter $\theta_{\tilde{p}}$ such that the estimate of the actual mobile device location p is distributed according to the probability distribution $P(p|\tilde{p}, \theta_{\tilde{p}})$. This implies that the probability of being at location i is defined as $$P(L_i|\tilde{p},\theta_{\tilde{p}}) = \int_{p \in \Omega_i}^{\Omega_i} P(p|\tilde{p},\theta_{\tilde{p}})dp. \quad [6]$$

Since this exactly the form of the estimator in equations [1] and [2], we can implement a GPS-based coarse location estimator by computing this result for each location and dividing by the normalization constant $\eta$.

For incorporation with the WiFi coarse location estimator, we define the GPS source data $d_{gps}(t)=[\tilde{p},\theta_{\tilde{p}}]^T$, and using Bayes' theorem, this implies that the data source model is $$P(d_{gps}(t) \mid L_i) = \frac{P(L_i \mid d_{gps}(t))P(d_{gps}(t))}{P(L_i)}.$$

When we have no prior estimate of $P(d_{gps}(t))$, and noting that the denominator only contributes to the normalization constant $\eta$ in equations [1] and [2], this implies that we can simplify the previous to $P(d_{gps}(t)|L_i)=P(L_i|d_{gps}(t))$. This can be incorporated with equations [1] and [2] and the WiFi-based coarse location estimator in equations [3] and [4] to give $$P(L_i \mid d_{wifi}(t), d_{gps}(t)) = \frac{P(d_{wifi}(t) \mid L_i)P(d_{gps}(t) \mid L_i)P(L_i)}{\eta}, \quad [7]$$

and, when no prior estimate for $L_i$ is available, $$P(L_i \mid d_{wifi}(t), d_{gps}(t)) = \frac{P(d_{wifi}(t) \mid L_i)P(d_{gps}(t) \mid L_i)}{\eta}. \quad [8]$$

Note that the probability in equation [6] could be simplified by using the distance to the location and estimating the probability, given the estimated GPS error distance, of being at the location of interest.

3. Particle-Based Location Estimates

We assume that the mobile device also has a particle filter that estimates the location of the device in G. We represent this as a set of particles $\tilde{P}$ such that for each particle $\tilde{p} \in \tilde{P}$, $\tilde{p} \in G$. These particles are distributed according to the estimate and uncertainty of the device location. We denote $|\tilde{P}|$ as the number of particles. Using the same location space definition from equation [5], we define $|P_{\Omega_i}|$ as the number of particles such that $i \in \Omega_i$. This implies that an estimate of probability of being at location i is $$P(L_i \| \tilde{P} |, |\tilde{P}_{\Omega_i}|) = \frac{|\tilde{P}_{\Omega_i}|}{|\tilde{P}|}.$$

Similar to the GPS model, this immediately implements a particle-based coarse location estimator. For incorporation with WiFi and GPS-based coarse location estimators, we define the particle source data $d_p(t)=[|\tilde{P}|, |P_{\Omega_i}|]^T$ and apply Bayes' theorem to give $$P(d_p(t) \mid L_i) = \frac{P(L_i \mid d_p(t))P(d_p(t))}{P(L_i)}$$

Ignoring any prior estimate of the particles and again noting that $P(L_i)$ only contributes to the normalization constant $\eta$, we simplify the previous to $P(d_p(t)|L_i)=P(L_i|d_p(t))$ which is incorporated into equations [1] and [2] and [7] and [8] to produce $$P(L_i \mid d_{wifi}(t), d_{gps}(t)), \quad [9]$$

$$d_p(t) = \frac{P(d_{wifi}(t) \mid L_i)P(d_{gps}(t) \mid L_i)P(d_p(t) \mid L_i)P(L_i)}{\eta},$$

and, when no prior estimate for $L_i$ is available, $$P(L_i \mid d_{wifi}(t), d_{gps}(t), d_p(t)) = \frac{P(d_{wifi}(t) \mid L_i)P(d_{gps}(t) \mid L_i)P(d_p(t) \mid L_i)}{\eta}.$$

The final coarse location estimator leverages WiFi information, GPS information and particle information in a data fusion framework to produce the estimated probability of being at each location i. This enables the system to estimate the coarse location as $$\underset{i}{\mathrm{argmax}}(P(L_i \mid d_{wifi}(t), d_{gps}(t), d_p(t)).$$

Additionally, the system can also suggest other, potential locations that maybe nearby and of interest for location context aware applications.

Example Processes

Figure 3:
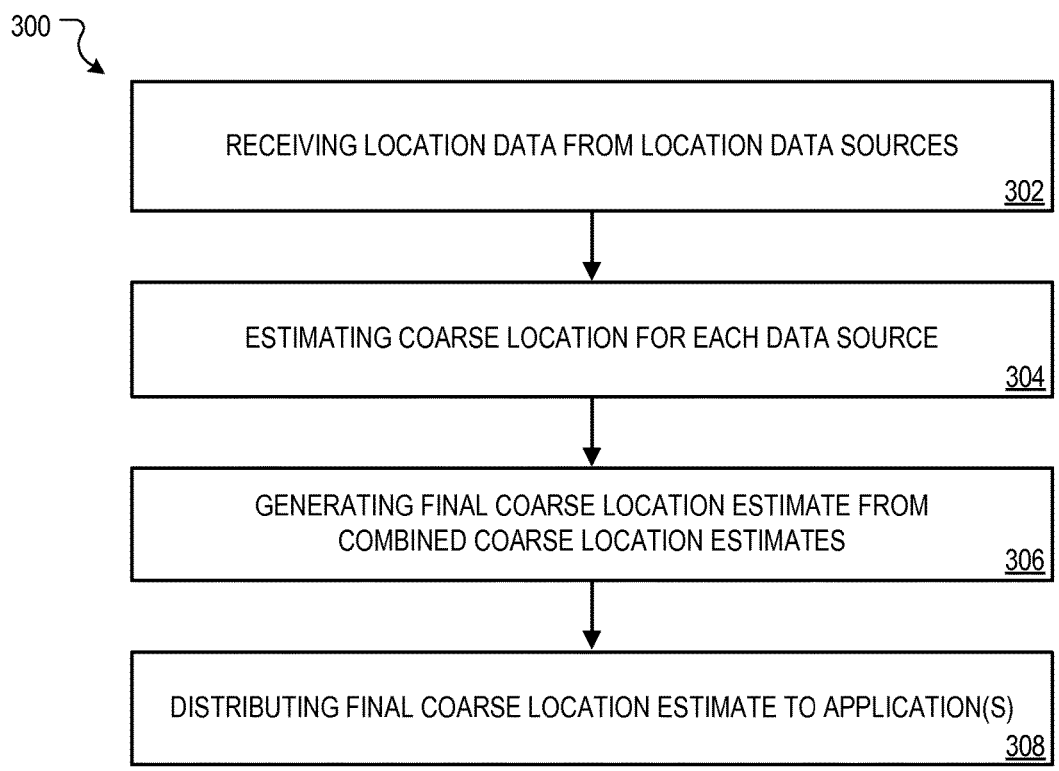
FIG. 3 is a flow diagram of an example process of coarse location estimation for mobile devices.

FIG. 3 is a flow diagram of example process 300 of coarse location estimation. In some implementations, process 300 can be implemented by device architecture 400, as described in reference to FIG. 4.

In some implementations, process 300 can begin by receiving location data from data sources (302). Some example location data sources include but are not limited to wireless network location information, GPS location information and particle filter location information, as described in reference to FIG. 2.

Process 300 can continue by estimating coarse location for each data source using the received location data (304). A statistical model can be used for each data source, as described in reference to FIG. 2.

Process 300 can continue by generating a final coarse location estimate from combined coarse location estimates for data sources (306). The statistical models for the data sources can be combined in a single classifier (e.g., Bayesian classifier) that provides a final coarse location estimate of the mobile device, as described in reference to FIG. 2.

Process 300 can continue by distributing the final coarse location estimate of the mobile device to one or more location context aware applications (308), such as a map or navigation application. The final coarse location estimate can be distributed by a location service of the mobile device to the one or more location context aware applications. For example, the final coarse location estimate can be used to detect mobile device presence at general locations of interest and switch operating modes and/or services for one or more location context aware applications.

Example Client Architecture

Figure 4:
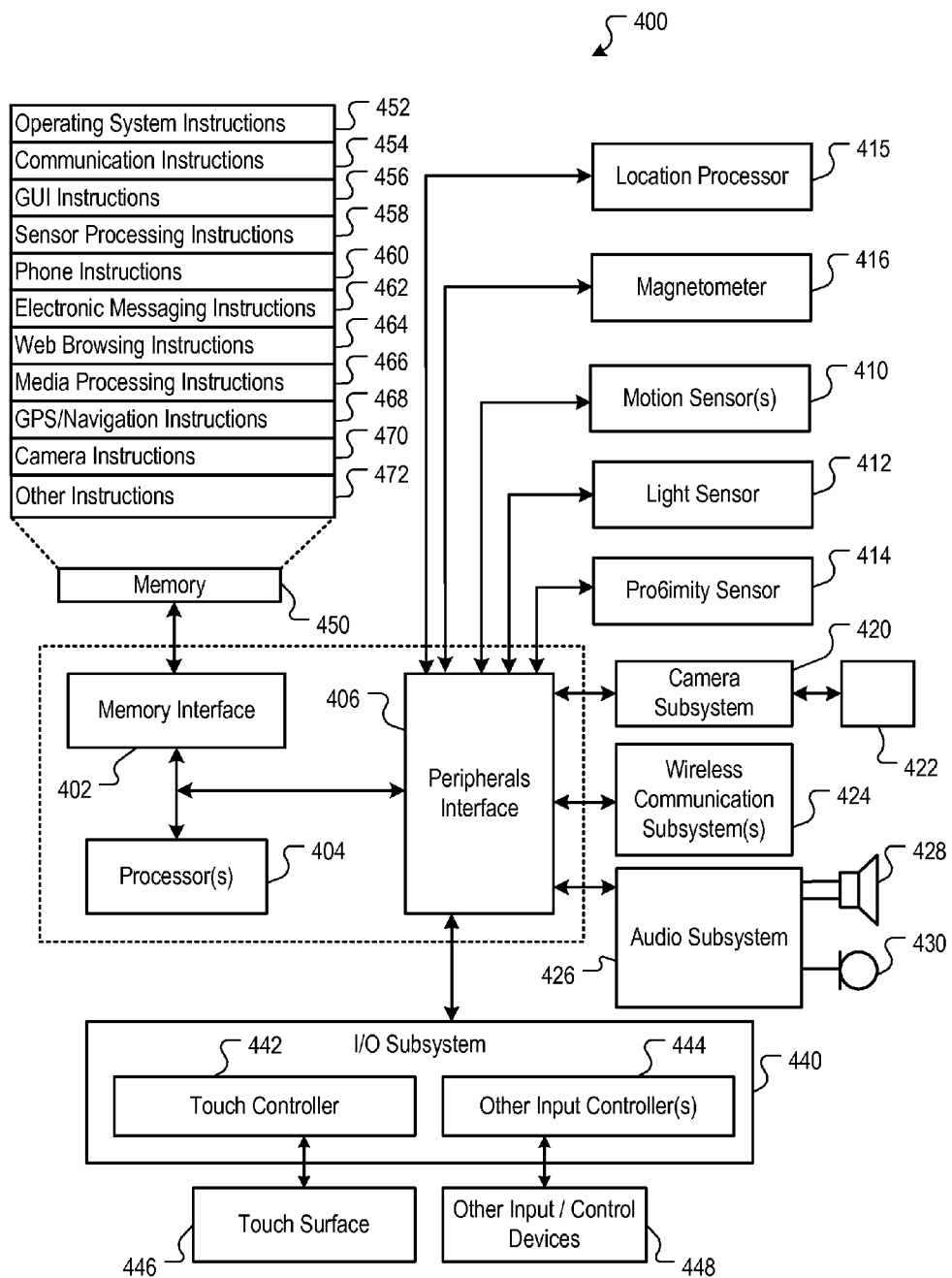
FIG. 4 is a block diagram of example client device architecture for implementing the features and processes described in reference to FIGS. 1-3.

FIG. 4 is a block diagram of example client device architecture 400 for implementing the features and processes described in reference to FIGS. 1-3. Architecture 400 may be implemented in any mobile device for generating the features described in reference to FIGS. 1-3, including but not limited to portable computers, smart phones and tablet computers, game consoles, wearable computers and the like. Architecture 400 may include memory interface 402, data processor(s), image processor(s) or central processing unit(s) 404, and peripherals interface 406. Memory interface 402, processor(s) 404 or peripherals interface 406 may be separate components or may be integrated in one or more integrated circuits. One or more communication buses or signal lines may couple the various components.

Sensors, devices, and subsystems may be coupled to peripherals interface 406 to facilitate multiple functionalities. For example, motion sensor 410, light sensor 412, and proximity sensor 414 may be coupled to peripherals interface 406 to facilitate orientation, lighting, and proximity functions of the device. For example, in some implementations, light sensor 412 may be utilized to facilitate adjusting the brightness of touch surface 446. In some implementations, motion sensor 410 (e.g., an accelerometer, gyros) may be utilized to detect movement and orientation of the device. Accordingly, display objects or media may be presented according to a detected orientation (e.g., portrait or landscape).

Other sensors may also be connected to peripherals interface 406, such as a temperature sensor, a biometric sensor, or other sensing device, to facilitate related functionalities.

Location processor 415 (e.g., GPS receiver chip) may be connected to peripherals interface 406 to provide georeferencing. Electronic magnetometer 416 (e.g., an integrated circuit chip) may also be connected to peripherals interface 406 to provide data that may be used to determine the direction of magnetic North. Thus, electronic magnetometer 416 may be used as an electronic compass.

Camera subsystem 420 and an optical sensor 422, e.g., a charged coupled device (CCD) or a complementary metal-oxide semiconductor (CMOS) optical sensor, may be utilized to facilitate camera functions, such as recording photographs and video clips.

Communication functions may be facilitated through one or more communication subsystems 424. Communication subsystem(s) 424 may include one or more wireless communication subsystems. Wireless communication subsystems 424 may include radio frequency receivers and transmitters and/or optical (e.g., infrared) receivers and transmitters. Wired communication system may include a port device, e.g., a Universal Serial Bus (USB) port or some other wired port connection that may be used to establish a wired connection to other computing devices, such as other communication devices, network access devices, a personal computer, a printer, a display screen, or other processing devices capable of receiving or transmitting data.

The specific design and implementation of the communication subsystem 424 may depend on the communication network(s) or medium(s) over which the device is intended to operate. For example, a device may include wireless communication subsystems designed to operate over a global system for mobile communications (GSM) network, a GPRS network, an enhanced data GSM environment (EDGE) network, 802.x communication networks (e.g., Wi-Fi, Wi-Max), code division multiple access (CDMA) networks, NFC and a Bluetooth™ network. Wireless communication subsystems 424 may include hosting protocols such that the device may be configured as a base station for other wireless devices. As another example, the communication subsystems may allow the device to synchronize with a host device using one or more protocols, such as, for example, the TCP/IP protocol, HTTP protocol, UDP protocol, and any other known protocol.

Audio subsystem 426 may be coupled to a speaker 428 and one or more microphones 430 to facilitate voice-enabled functions, such as voice recognition, voice replication, digital recording, and telephony functions.

I/O subsystem 440 may include touch controller 442 and/or other input controller(s) 444. Touch controller 442 may be coupled to a touch surface 446. Touch surface 446 and touch controller 442 may, for example, detect contact and movement or break thereof using any of a number of touch sensitivity technologies, including but not limited to capacitive, resistive, infrared, and surface acoustic wave technologies, as well as other proximity sensor arrays or other elements for determining one or more points of contact with touch surface 446. In one implementation, touch surface 446 may display virtual or soft buttons and a virtual keyboard, which may be used as an input/output device by the user.

Other input controller(s) 444 may be coupled to other input/control devices 448, such as one or more buttons, rocker switches, thumb-wheel, infrared port, USB port, and/or a pointer device such as a stylus. The one or more buttons (not shown) may include an up/down button for volume control of speaker 428 and/or microphone 430.

In some implementations, device 400 may present recorded audio and/or video files, such as MP3, AAC, and MPEG video files. In some implementations, device 400 may include the functionality of an MP3 player and may include a pin connector for tethering to other devices. Other input/output and control devices may be used.

Memory interface 402 may be coupled to memory 450. Memory 450 may include high-speed random access memory or non-volatile memory, such as one or more magnetic disk storage devices, one or more optical storage devices, or flash memory (e.g., NAND, NOR). Memory 450 may store operating system 452, such as Darwin, RTXC, LINUX, UNIX, OS X, WINDOWS, or an embedded operating system such as VxWorks. Operating system 452 may include instructions for handling basic system services and for performing hardware dependent tasks. In some implementations, operating system 452 may include a kernel (e.g., UNIX kernel).

Memory 450 may also store communication instructions 454 to facilitate communicating with one or more additional devices, one or more computers or servers, including peer-to-peer communications. Communication instructions 454 may also be used to select an operational mode or communication medium for use by the device, based on a geographic location (obtained by the GPS/Navigation instructions 468) of the device. Memory 450 may include graphical user interface instructions 456 to facilitate graphic user interface processing, including a touch model for interpreting touch inputs and gestures; sensor processing instructions 458 to facilitate sensor-related processing and functions; phone instructions 460 to facilitate phone-related processes and functions; electronic messaging instructions 462 to facilitate electronic-messaging related processes and functions; web browsing instructions 464 to facilitate web browsing-related processes and functions; media processing instructions 466 to facilitate media processing-related processes and functions; GPS/Navigation instructions 468 to facilitate GPS and navigation-related processes, including the components of system 200 described in reference to FIG. 2; camera instructions 470 to facilitate camera-related processes and functions; and other instructions 472 for performing some or all of the processes, as described in reference to FIGS. 1-3.

Each of the above identified instructions and applications may correspond to a set of instructions for performing one or more functions described above. These instructions need not be implemented as separate software programs, procedures, or modules. Memory 450 may include additional instructions or fewer instructions. Furthermore, various functions of the device may be implemented in hardware and/or in software, including in one or more signal processing and/or application specific integrated circuits (ASICs).

The features described may be implemented in digital electronic circuitry or in computer hardware, firmware, software, or in combinations of them. The features may be implemented in a computer program product tangibly embodied in an information carrier, e.g., in a machine-readable storage device, for execution by a programmable processor; and method steps may be performed by a programmable processor executing a program of instructions to perform functions of the described implementations by operating on input data and generating output.

The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer may communicate with mass storage devices for storing data files. These mass storage devices may include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with an author, the features may be implemented on a computer having a display device such as a CRT (cathode ray tube) or LCD (liquid crystal display) monitor for displaying information to the author and a keyboard and a pointing device such as a mouse or a trackball by which the author may provide input to the computer.

The features may be implemented in a computer system that includes a back-end component, such as a data server or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include a LAN, a WAN and the computers and networks forming the Internet.

The computer system may include clients and servers. A client and server are generally remote from each other and typically interact through a network. The relationship of client and server arises by virtue of computer programs running on the respective computers and having a client-server relationship to each other.

One or more features or steps of the disclosed embodiments may be implemented using an Application Programming Interface (API). An API may define on or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

As described above, some aspects of the subject matter of this specification include gathering and use of data available from various sources to improve services a mobile device can provide to a user. The present disclosure contemplates that in some instances, this gathered data may identify a particular location or an address based on device usage. Such personal information data can include location-based data, addresses, subscriber account identifiers, or other identifying information.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

In the case of advertisement delivery services, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

A number of implementations have been described. Nevertheless, it will be understood that various modifications may be made. Elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
   receiving, by a processor of a computing device operating at a location, sensor data from a plurality of data sources;
   determining, by the processor, a first estimated probability that the computing device is at the location based on first sensor data from a wireless network data source and a first data source model;
   determining, by the processor, a second estimated probability that the computing device is at the location based on second sensor data from a Global Navigation Satellite System (GNSS) data source and a second data source model;
   determining, by the processor, a third estimated probability that the computing device is at the location based on particle filter data;
   combining, by the processor, the first, second and third estimated probabilities; and
   generating, by the processor, a coarse estimate of the location of the computing device based on the combined first, second and third estimated probabilities; and
   displaying the coarse estimate on the computing device.

2. The method of claim 1, where combining the first, second and third estimated probabilities further comprises:

combining the first, second and third estimated probabilities in a Bayesian classifier.

3. The method of claim 2, where the first estimated probability is given by $$P(L_i \mid d_{wifi}(t)) = \frac{P(d_{wifi}(t) \mid L_i)}{\eta}$$

and the second estimated probability is given by $$P(L_i \mid d_{gps}(t)) = \frac{P(d_{gps}(t) \mid L_i)}{\eta},$$

where $\eta$ is a normalization constant, $d_{gps}(t)$ is GNSS data, $L_i$ is a state of being at location i and $d_{wifi}(t)$ is wireless network data.

4. The method of claim 3, where the third estimated probability is given by $$P(L_i \mid d_p(t)) = \frac{P(dp(t) \mid L_i)}{\eta},$$

and $d_p(t)$ is the particle filter data.

5. The method of claim 1, where generating a coarse estimate of the location of the computing device based on the combined first, second and third estimated probabilities further comprises:
determining a maximum likelihood that the computing device is at the location based on the first, second and third estimated probabilities.

6. A computing device, comprising:
one or more processors;
memory coupled to the one or more processors and storing instructions, which, when executed by the one or more processors, causes the one or more processors to perform operations comprising:
receiving sensor data from a plurality of data sources;
determining a first estimated probability that the computing device is at a location based on first sensor data from a wireless network data source and a first data source model;
determining a second estimated probability that the computing device is at the location based on second sensor data from a Global Navigation Satellite System (GNSS) data source and a second data source model;
determining a third estimated probability that the computing device is at the location based on a particle filter model;
combining the first, second and third estimated probabilities;
generating a coarse estimate of the location of the computing device based on the combined first, second and third estimated probabilities; and
displaying the coarse estimate on the computing device.

7. The computing device of claim 6, where combining the first and second estimated probabilities further comprises:
combining the first, second and third estimated probabilities in a Bayesian classifier.

8. The computing device of claim 7, where the first estimated probability is given by $$P(L_i \mid d_{wifi}(t)) = \frac{P(d_{wifi}(t) \mid L_i)}{\eta}$$

and the second estimated probability is given by $$P(L_i \mid d_{gps}(t)) = \frac{P(d_{gps}(t) \mid L_i)}{\eta},$$

$L_i$ is a state of being at location i, where $\eta$ is a normalization constant, $d_{gps}(t)$ is GNSS data and $d_{wifi}(t)$ is wireless network data.

9. The computing device of claim 8, where the third estimated probability is given by $$P(L_i \mid d_p(t)) = \frac{P(dp(t) \mid L_i)}{\eta},$$

and $d_p(t)$ is the particle filter data.

10. The computing device of claim 6, where generating a coarse estimate of the location of the computing device based on the combined first, second and third estimated probabilities further comprises:
determining a maximum likelihood that the computing device is at the location based on the first, second and third estimated probabilities.

11. A non-transitory, computer-readable storage medium storing instructions, which, when executed by one or more processors, causes the one or more processors to perform operations comprising:
receiving sensor data from a plurality of data sources;
determining a first estimated probability that a computing device is at a location based on first sensor data from a wireless network data source and a first data source model;
determining a second estimated probability that the computing device is at the location based on second sensor data from a Global Navigation Satellite System (GNSS) data source and a second data source model;
determining a third estimated probability that the computing device is at the location based on a particle filter model;
combining the first, second and third estimated probabilities;
generating a coarse estimate of the location of the computing device based on the combined first, second and third estimated probabilities; and
displaying the coarse estimate on the computing device.

12. The computer-readable storage medium of claim 11, where combining the first and second estimated probabilities further comprises:
combining the first, second and third estimated probabilities in a Bayesian classifier.

13. The computer-readable storage medium of claim 11, where the first estimated probability is given by $$P(L_i \mid d_{wifi}(t)) = \frac{P(d_{wifi}(t) \mid L_i)}{\eta}$$

and the second estimated probability is given by $$P(L_i \mid d_{gps}(t)) = \frac{P(d_{gps}(t) \mid L_i)}{\eta},$$

where $\eta$ is a normalization constant, $d_{gps}(t)$ is GNSS data and $d_{wifi}(t)$ is wireless network data.

14. The computer-readable storage medium of claim 13, where the third estimated probability is given by $$P(L_i \mid d_p(t)) = \frac{P(dp(t) \mid L_i)}{\eta},$$

and $d_p(t)$ is the particle filter data.

15. The computer-readable storage medium of claim 11, where generating a coarse estimate of the location of the computing device based on the combined first, second and third estimated probabilities further comprises:
  determining a maximum likelihood that the computing device is at the location based on the first, second and third estimated probabilities.

* * * * *